United States Patent [19]

Hamada et al.

[11] Patent Number: 5,861,460
[45] Date of Patent: Jan. 19, 1999

[54] METHOD FOR THE CONTINUOUS PRODUCTION OF ROOM-TEMPERATURE-CURABLE ORGANOPOLYSILOXANE COMPOSITIONS

[75] Inventors: Mitsuo Hamada, Chiba Prefecture; Tomoo Kinoshita, Fukui Prefecture; Hideyuki Mori, Fukui Prefecture; Junya Yokoi, Fukui Prefecture, all of Japan

[73] Assignee: Dow Corning Toray Silicone Co., LTD., Tokyo, Japan

[21] Appl. No.: 625,568

[22] Filed: Mar. 28, 1996

[30] Foreign Application Priority Data

Mar. 31, 1995 [JP] Japan ..................................... 7-099502

[51] Int. Cl.$^6$ ..................................................... C08L 83/04
[52] U.S. Cl. .......................... 524/860; 524/423; 524/425; 524/436; 524/588; 524/787; 524/788; 524/789; 524/866
[58] Field of Search ..................................... 524/863, 860, 524/588, 787, 788, 789, 423, 436, 425, 866

[56] References Cited

U.S. PATENT DOCUMENTS

| | | | |
|---|---|---|---|
| 3,998,433 | 12/1976 | Iwako | 259/8 |
| 4,528,324 | 7/1985 | Chung | 524/863 |
| 5,227,111 | 7/1993 | Brangers et al. | 264/211.23 |
| 5,356,954 | 10/1994 | Adachi et al. | 523/200 |

FOREIGN PATENT DOCUMENTS

| | | |
|---|---|---|
| 555 044 | 2/1992 | European Pat. Off. . |
| 512 730 | 11/1992 | European Pat. Off. . |
| 688 598 | 12/1995 | European Pat. Off. . |
| 2610 | 1/1990 | Japan . |

OTHER PUBLICATIONS

U.S. application No. 08/492,261, filed 19 Jun. 1995, titled "Device for continuously Mixing Liquid and Powders".

Primary Examiner—Patricia A. Short
Attorney, Agent, or Firm—Roger H. Borrousch; William F. Boley

[57] ABSTRACT

A highly productive, continuous method for the production of room-temperature-curable organopolysiloxane compositions is obtained by continuously feeding 100 parts by weight of a diorganopolysiloxane with a viscosity at 25° C. of 0.1 to 500 Pa.s that contains at least 2 silicon-bonded hydroxyl groups or hydrolyzable groups in each molecule; 1 to 30 parts by weight of an organosilane that contains at least 2 silicon-bonded hydrolyzable groups in each molecule, or the partial hydrolysis condensate thereof; 1 to 200 parts by weight of an inorganic filler in powder form, and 0 to 10 parts by weight of a cure-accelerating catalyst into a continuous mixing apparatus having starting material feed openings installed at its top, a discharge opening installed at its bottom, and a rotating disk installed within a casing and are therein mixed by the rotation of the said rotating disk, and in that the resulting mixture is thereafter continuously introduced into a vacuum mechanism- equipped degassing apparatus in which the water fraction present in the said mixture is removed under reduced pressure.

2 Claims, 2 Drawing Sheets

METHOD FOR THE CONTINUOUS PRODUCTION OF ROOM-TEMPERATURE-CURABLE ORGANOPOLYSILOXANE COMPOSITIONS

BACKGROUND OF THE INVENTION

1. Field of the Invention

This invention relates to a method for the continuous production of room-temperature-curable organopolysiloxane compositions that are cured at ambient temperatures by moisture present in air.

2. Prior Art and Problems Therein

Room-temperature-curable organopolysiloxane compositions that are cured by atmospheric moisture at ambient temperature into rubbery elastomers are already well known. They have found wide application as sealants, commercial adhesives, potting agents, mold-making materials, and so forth, in a number of fields, such as construction, machinery, and electrical applications. Room-temperature-curable organopolysiloxane compositions are typically produced by mixing diorganopolysiloxane having at least 2 silicon-bonded hydroxyl groups in each molecule, organosilane having at least 2 silicon-bonded hydrolyzable groups in each molecule, and inorganic filler powder using a mixing means having a stirring or agitating action, such as a Henschel mixer or kneader mixer. However, these production methods suffer from a poor productivity, and the appearance has therefore been desired of a highly productive method for producing room-temperature-curable organopolysiloxane compositions.

SUMMARY OF THE INVENTION

Problems to Be Solved by the Invention

The present inventors achieved the present invention as the result of extensive investigations directed to solving the problem described above.

In specific terms, then, the present invention takes as its object a highly productive, continuous method for the preparation of room-temperature-curable organopolysiloxane compositions.

Means Solving the Problems and Function Thereof

The present invention relates to a method for the continuous production of room-temperature-curable organopolysiloxane compositions comprising continuously feeding (A) 100 parts by weight of a diorganopolysiloxane with a viscosity at 25° C. of 0.1 to 500 Pa.s that contains at least 2 silicon-bonded hydroxyl groups or hydrolyzable groups in each molecule;

(B) 1 to 30 parts by weight of an organosilane that contains at least 2 silicon-bonded hydrolyzable groups in each molecule, or the partial hydrolysis condensate thereof;

(C) 1 to 200 parts by weight of an inorganic filler in powder form; and (D) 0 to 10 parts by weight of a cure-accelerating catalyst into a continuous mixing apparatus having starting material feed openings installed at its top, a discharge opening installed at its bottom, and a rotating disk installed within a casing and are therein mixed by the rotation of said rotating disk, and in that the resulting mixture is thereafter continuously introduced into a vacuum mechanism-equipped degassing apparatus in which a water fraction present in the said mixture is removed under reduced pressure.

Figure 1:
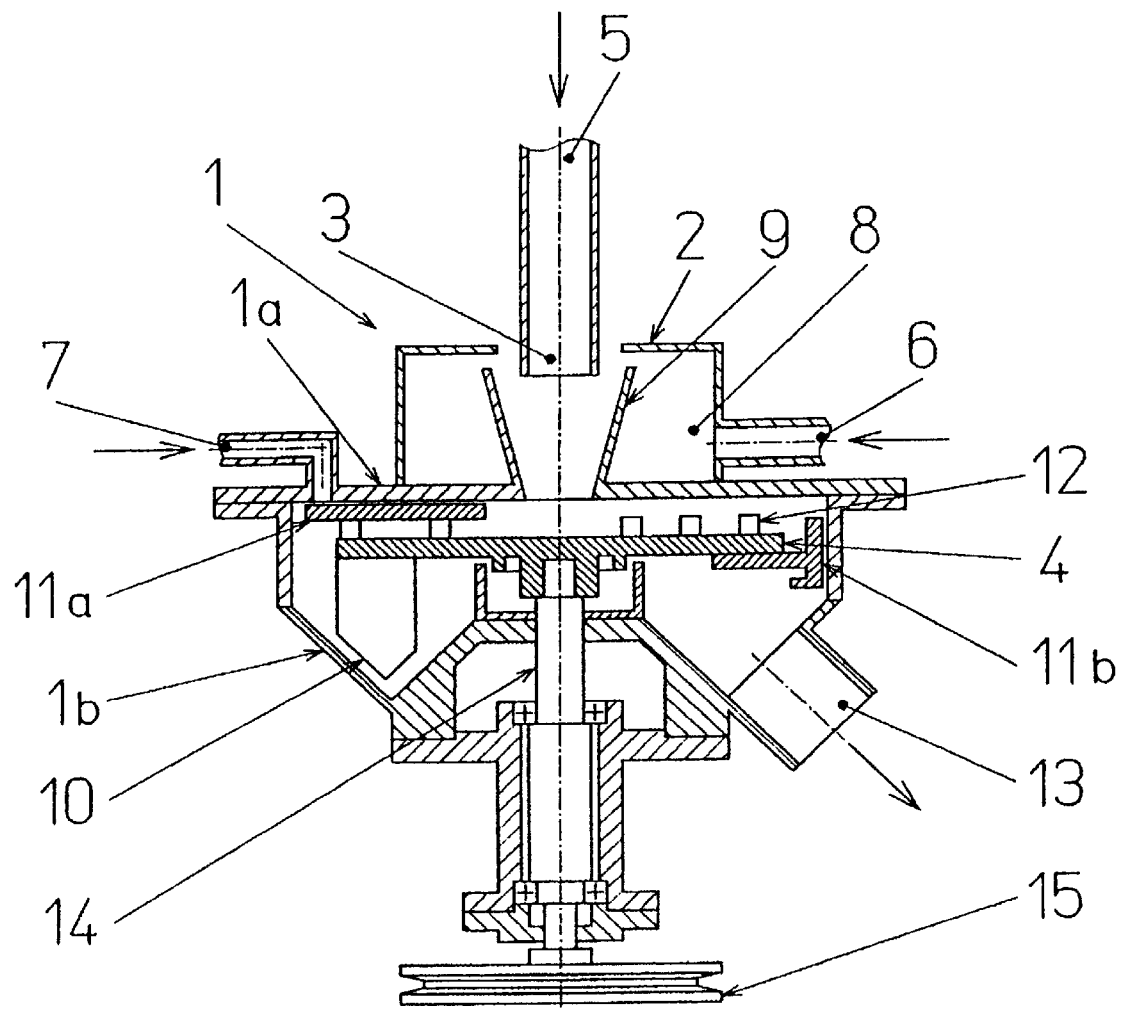
FIG. 1 contains an example of a continuous mixing apparatus that can be used by the present invention.

Reference numbers
1 body of the continuous mixing apparatus
2 cylindrical casing
3 bottom end of the powder feed inlet
1a top plate
1b inclined surface in the form of an inverted cone
4 rotating disk
5 powder feed inlet
6 liquid feed inlet
7 liquid feed opening
8 liquid reservoir
9 overflow tube
10 rake-out blade
11a top-surface scraper
11b side scraper
12 mixing pin
13 discharge opening
14 rotating axle
15 pulley
16 degassing apparatus (vented twin-screw extruder)
17 feed inlet
18 vacuum vent opening
19 screw
20 discharge opening
A storage bin for inorganic filler powder
B storage tank for dimethylpolysiloxane
C storage tank for liquid additive

DETAILED DESCRIPTION OF THE PREFERRED EMBODIMENTS

The diorganopolysiloxane (A) used by the present invention is the base ingredient of the room-temperature-curable organopolysiloxane compositions, and it must contain at least 2 silicon-bonded hydroxyl groups or hydrolyzable groups in each molecule. This diorganopolysiloxane is well known as a starting material for room-temperature-curable organopolysiloxane compositions, and those diorganopolysiloxanes already known from the art can be used in the present invention. Among these, hydroxyl-terminated diorganopolysiloxane with the following formula is preferred

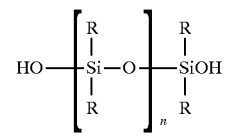

in which n is a positive integer that yields a viscosity at 25° C. of 0.1 to 500 Pa.s and R is represents substituted and unsubstituted monovalent hydrocarbon groups.

The R group in the above formula is exemplified by monovalent hydrocarbon groups such as methyl, ethyl, propyl, butyl, vinyl, phenyl, and the like, and by substituted monovalent hydrocarbon groups such as chloromethyl, cyanoethyl, 3,3,3-trifluoropropyl, and so forth. Component (A) must have a viscosity at 25° C. in the range from 0.1 to 500 Pa.s. Good physical properties become difficult to obtain at below 0.1 Pa.s. At above 500 Pa.s, the room-temperature-curable organopolysiloxane compositions obtained by the production method according to the present invention suffer from problems such as poor extrudability and poor curability.

Component (B) used in the present invention is a crosslinker that crosslinks component (A) to produce a network structure. Component (B) is specifically exemplified by organosilanes such as methyltrimethoxysilane, vinyltriethoxysilane, methylvinylethoxysilane, methyltri(methyl ethyl ketoximo)silane, vinyltri(methyl ethyl ketoximo)silane, phenyltri(methyl ethyl ketoximo)silane, methyltriacetoxysilane, vinyltriacetoxysilane, phenyltriacetoxysilane, dimethyldlacetoxysilane, methylethoxydiacetoxysilane, methyltri(N,N-diethylaminoxy)silane, vinyltri(N,N-diethylaminoxy)silane, vinyltri(N-cyclohexylamino)silane, vinyltri(N-methylacetamido)silane, tetraacatoxysilane, tetra(methyl ketoximo)silane, and the like, and by the partial hydrolysis condensates of the preceding. Component (B) should be added at 1 to 30 parts by weight per 100 parts by weight component (A). The use of less than 1 part by weight component (B) prevents the production of a cured product having an excellent rubbery elasticity and-excellent mechanical properties. The use of more than 30 parts by weight causes a reduced mechanical strength in the cured products afforded by the room-temperature-curable organopoly-siloxane compositions.

Inorganic filler powder (C) used in the present invention can be a reinforcing filler used for the purpose of imparting mechanical strength to the cured products obtained by curing the room-temperature-curable organopolysiloxane compositions. The reinforcing inorganic filler powder is exemplified by fumed silica, calcined silica, and precipitated silica, and by these silicas after surface hydrophobicization with organochlorosilane, organopolysiloxane, or hexamethyldisilazane etc. These reinforcing silica fillers can be present in amounts of from 5 to 50 parts by weight per 100 parts by weight of (A) and preferably from 5 to 25 parts by weight per 100 parts by weight of (A). Other examples of inorganic fillers include extending fillers which are exemplefied by calcium carbonate, magnesium carbonate, quartz, diatomaceous earth, barium sulfate, calcium sulfate, and so forth. Component (C) is added at from 1 to 200 parts by weight per 100 parts by weight component (A) and is preferably added at from 5 to 150 parts by weight per 100 parts by weight component (A). An acceptable mechanical strength is not obtained in the cured product at additions of less than 5 parts by weight of reinforcing silica filler is used. On the other hand, the addition of more than 200 parts by weight per 100 parts by weight of (A) causes the resulting room-temperature-curable organopolysiloxane composition itself to have a too high viscosity.

Cure-accelerating catalyst (D) used in the present invention is used on an optional basis, and its purpose is to accelerate the cure of the room-temperature-curable organopoly-siloxane composition by accelerating the condensation reaction between components (A) and (B). The cure-accelerating catalyst is specifically exemplified by metal carboxylates such as iron octoate, cobalt octoate, manganese octoate, tin naphthenate, and tin octoate; organotin compounds such as dibutyltin acetate, dibutyltin octoate, dibutyltin dilaurate, and diphenyltin acetate; organotitanium compounds such as tetrabutyl titanate, triethanolamine titanate, tetra-2-ethylhexyl titanate, titanium acetoacetate, and organosiloxy-titanium; and alkoxyaluminum compounds. This component is added at from 0 to 10 parts by weight per 100 parts by weight component (A) and preferably at from 0.01 to 10 parts by weight parts per 100 parts by weight component (A).

In the present invention, the above-described components (A) to (C) or components (A) to (D) are continuously fed in their specified quantities into a continuous mixing apparatus having starting material feed openings installed at its top, a discharge opening installed at its bottom, and a rotating disk installed within a casing and are therein mixed in their specified quantities by the rotation of the said rotating disk. The continuous mixing apparatus used for this purpose is already known from Japanese Patent Publication Number Hei 2-2610 (1990) and U.S. Pat. No. 3,998,433, issued Dec. 21, 1976, to Hiroyukl which is equivalent to Japanese Patent Publication Number Sho 53-38828 (1978) in the form of apparatuses for mixing a liquid and a powder. The inventors have themselves already proposed an apparatus that improves a section of these prior continuous mixing apparatuses application Ser. No. 08/492,261, filed Jun. 19, 1995, for Mitsuo Hamada and Hidyuki Mori, and assigned to the same assignee as this application and is titled "Device for Continuously Mixing Liquid and Powders" which is hereby incorporated by reference to show the mixer and equivalent to Japanese Patent Application Number Hei 6-139056 (1994).

An example of the continuous mixing apparatus used in the present invention will be explained with reference to the drawings. FIG. 1 gives one example of a continuous mixing apparatus for use in the present invention. A cylindrical casing 2 forms the shell of the mixing apparatus body 1. A powder feed inlet 5 for powder intake is installed at the center of the upper plate 1a of this casing, while the central region of the casing contains a rotating disk 4 for liquid-powder mixing and its lower region forms an inclined surface 1b in the shape of an inverted cone. A discharge opening 13 for the mixture is installed in this inclined surface 1b. At the side of the casing there is connected a liquid feed opening 7 for the feed of the various liquid additives, such as the crosslinker, curing agent, plasticizer, and so forth, while in its interior there is formed a liquid reservoir 8. An overflow tube 9 in the form of an inverted cone is connected to the mixing apparatus body 1 so as to ascend into the liquid reservoir 8, and the bottom end 3 of the powder feed inlet 5 faces on the inlet to the overflow tube 9. A rotating disk 4 is installed in the central region of the cylindrical casing 2 so as to face the bottom end 3 of the powder feed inlet 5.

The starting diorganopolysiloxane is supplied through liquid feed inlet 6 and the starting inorganic filler powder is supplied through the powder feed inlet 5. The various liquid additives, such is the crosslinker, curing agent, and plasticizer, are supplied through the liquid feed opening 7. The diorganopolysiloxane fed through liquid feed inlet 6 is first stored in liquid reservoir 8 and then flows down along the inside wall from the top edge of the overflow tube 9 and is mixed with the inorganic filler powder supplied from the powder feed inlet 5. This mixture is then mixed with the various liquid additives. The mixture is discharged through the action of rakeout blade 10 from discharge opening 13 to the outside of the continuous mixing apparatus. The rotating disk 4 is disposed to rotate freely within the mixing compartment and is equipped with a plural number of top-surface scrapers 11a and a plural number of mixing pins 12 that are embedded in the rotating disk 4. The center of rotation of the rotating disk 4 is fixed at the top end of a rotating axle 14, and the bottom end of the rotating axle 14 is connected to a pulley 15. This pulley 15 is set up to be driven by rotational power from a motor (not shown). Its rotation rate is preferably from 400 to 1500 rpm.

The rotation rate of the rotating disk in the above-described continuous mixing apparatus is preferably from 500 to 1,500 rpm in the present invention. This apparatus can be equipped with a jacket for cooling.

The production method according to the present invention then continues with the introduction of the mixture discharged from the above-described continuous mixing apparatus into a degassing apparatus that is equipped with a vacuum mechanism. The air, volatiles, and water present in the mixture are removed in this apparatus under reduced pressure. No specific restrictions apply to the vacuum mechanism-equipped degassing apparatus employed here, and the invention method can use those apparatuses already known for the vacuum removal of the gases (e.g., air, etc.) and volatiles present in liquids and pastes. The subject apparatus is exemplified by vented single- screw and twin-screw extruders. Transport means such as a gear pump, piston pump, tubular pump, etc., can be used to feed the mixture produced in the continuous mixing apparatus into the degassing apparatus.

Figure 2:
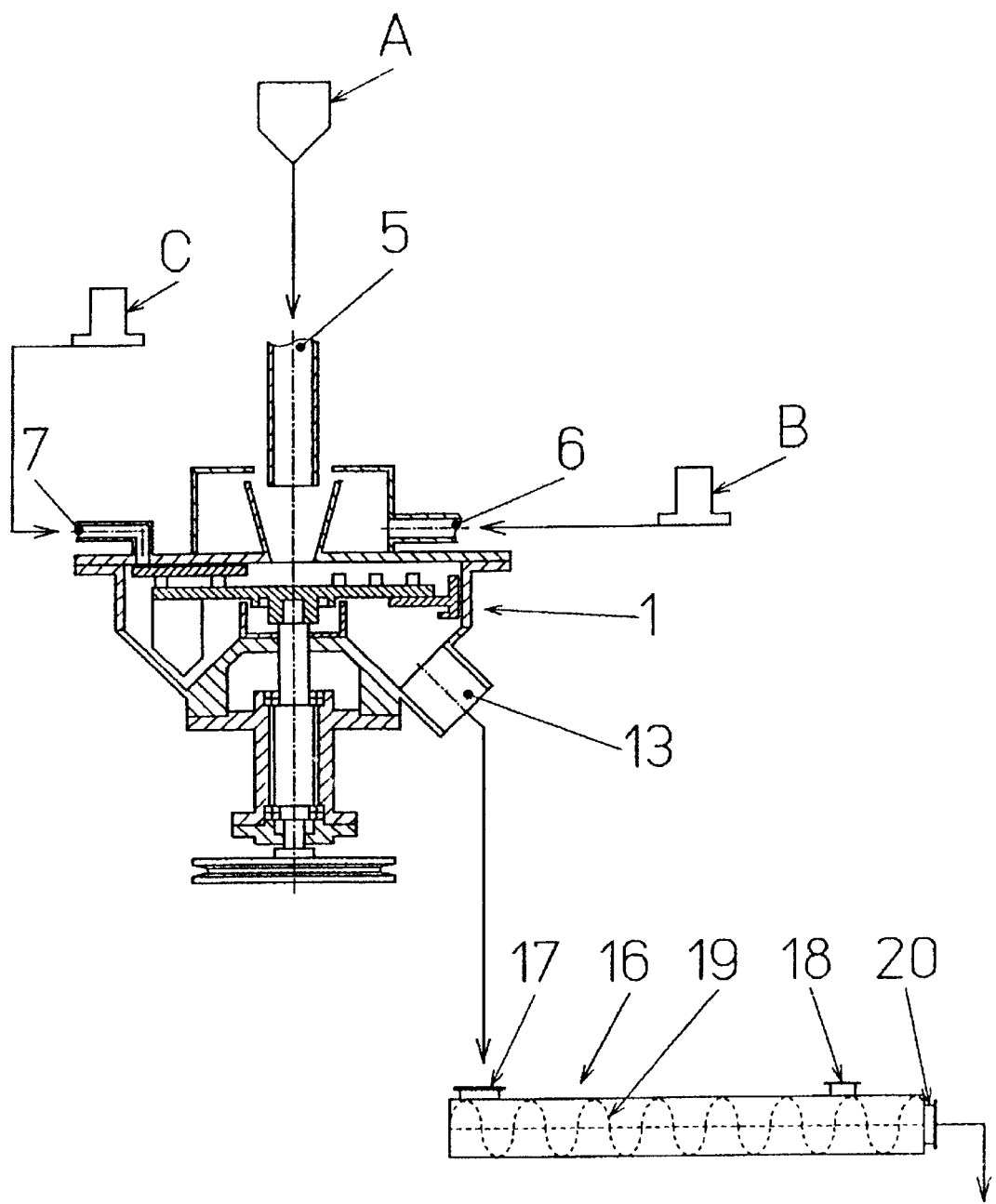
FIG. 2 contains a schematic drawing of one example of the continuous production method according to the present invention.

The invention will be explained in greater detail below through working examples. The room-temperature-curable organopolysiloxane compositions were prepared in the examples using the method depicted in FIG. 2. The properties of the room-temperature-curable organopolysiloxane compositions were measured and evaluated in the examples using the following procedures. "Parts" represents "parts by weight" and the viscosities were those measured at 25° C.

Water content

The particular room-temperature-curable organopolysiloxane composition was dissolved in xylene and the amount of water present in this solution was measured using a Karl Fischer water titration instrument from Kyoto Denki Kogyo Kabushiki Kaisha of Japan.

Mechanical properties

The particular room-temperature-curable organopolysiloxane composition was introduced into a mold designed for the production of specimens for physical property measurements and was cured into a 2-mm thick sheet by standing for 7 days at 25° C. and 55% humidity. The mechanical properties of this sheet were measured according to the procedures of Japanese Industrial Standard K 6301.

Storage stability

The particular room-temperature-curable organopolysiloxane composition was sealed in an aluminum cartridge, and this cartridge was held for 3 months at room temperature. After this holding period, a sample of the composition was removed from the cartridge, heated in a 70° C. oven for 2 hours, and scored for the presence/absence of foaming.

EXAMPLE 1

Mixing was carried out by the rotation of the rotating disk within continuous mixing apparatus 1 while 50 parts precipitated calcium carbonate powder (average particle size= 0.07 micrometers, surface treated with fatty acid) was continuously fed through the powder feed inlet 5 of the continuous mixing apparatus 1, 50 parts hydroxyl-terminated dimethylpolysiloxane with a viscosity of 15 Pa.s was supplied at the same time through the liquid feed inlet 6, and 5 parts of a mixture of methyltrimethoxysilane and titanate ester was continuously fed through liquid feed opening 7. A mixture was continuously discharged from the discharge opening 13 of the continuous mixing apparatus 1 and was then supplied to the feed inlet 17 of a vented twin-screw extruder 16 (L/D=10) from Plastic Kogaku Kenkyu-sha of Japan. A tubular pump was used to transport the mixture from the discharge opening of the continuous mixing apparatus 1 to the twin-screw extruder 16. The water, volatiles, and air present in the mixture were continuously removed by the imposition of a vacuum within the twin-screw extruder 16 through the vacuum vent opening 18. Three vacuum conditions (48 kPa, 21.3 kPa, and 2.7 kPa) were executed. The mixture, at this point taking the form of the target room-temperature-curable organopolysiloxane composition, was continuously discharged from discharge opening 20 and sealed into aluminum cartridges. The properties of this room-temperature-curable organopolysiloxane composition were measured and these results were as reported in Table 1.

TABLE 1

|  | Example | | |
| --- | --- | --- | --- |
|  | 1-1 | 1-2 | 1-3 |
| Vacuum, kPa | 48 | 21.3 | 2.7 |
| Durometer | 26 | 26 | 26 |
| Tensile strength, kPa | 1775 | 1795 | 1814 |
| Elongation, % | 482 | 505 | 512 |
| Foamed | no | no | no |
| Water content, % | 0.16 | 0.13 | 0.12 |

EXAMPLE 2

Mixing was carried out by the rotation of the rotating disk while 20 parts surface-hydrophobicized fumed silica powder (R972 from Nippon Aerosil Kabushiki Kaisha of Japan, specific surface area=200 $m^2/g$) was fed through the feed inlet 5 of the continuous mixing apparatus 1, 100 parts hydroxyl-terminated dimethylpolysiloxane with a viscosity of 15 Pa.s was at the same time supplied through the liquid feed inlet 6, and 5 parts of a mixture of methyltris(methyl ethyl ketoximo)silane and dibutyltin dilaurate was fed through additive feed opening 7. The mixture was continuously discharged from the discharge opening 13 of the continuous mixing apparatus 1 and was then supplied to the feed inlet 17 of a vented twin-screw extruder 16 (L/D=10) from Plastic Kogaku Kenkyu-sha of Japan. A tubular pump was used to transport the mixture from the discharge opening of the continuous mixing apparatus to the twin-screw extruder. The water, volatiles, and air present in the mixture were continuously removed by the imposition of a vacuum within the vented twin-screw extruder through the vacuum vent opening 18. Three vacuum conditions (21.3 kPa and 2.7 kPa) were executed. The product ejected from the twin-screw mixer, at this point taking the form of the target room-temperature-curable organopolysiloxane composition, was continuously discharged from discharge opening 20 and sealed into aluminum cartridges. The properties of this room-temperature-curable organopolysiloxane composition were measured and these results were as reported in Table 2.

TABLE 2

|  | Example | |
| --- | --- | --- |
|  | 2-1 | 2-2 |
| Vacuum, kPa | 21.3 | 2.7 |
| Durometer | 26 | 26 |
| Tensile strength, kPa | 1844 | 1824 |
| Elongation, % | 470 | 480 |

Effects of the Invention

The production method according to the present invention is characterized by an excellent productivity and by its ability to produce high-quality room-temperature-curable organopolysiloxane compositions at high levels of productivity. These characteristics accrue because said production method of continuously feeding (A) 100 parts by weight of a diorganopolysiloxane with a viscosity at 25° C. of 0.1 to 500 Pa.s that contains at least 2 silicon-bonded hydroxyl groups or hydrolyzable groups in each molecule, (B) 1 to 30 parts by weight of an organosilane that contains at least 2 silicon-bonded hydrolyzable groups in each molecule, or the partial hydrolysis condensate thereof, (C) 1 to 200 parts by weight of an inorganic filler in powder form, and (D) 0 to 10 parts by weight of a cure-accelerating catalyst into a continuous mixing apparatus having starting material feed openings installed at its top, a discharge opening installed at its bottom, and a rotating disk installed within a casing and therein mixes said components by the rotation of the said rotating disk, and thereafter continuously introduces the obtained mixture into a vacuum mechanism-equipped degassing apparatus in which the water fraction present in the said mixture is removed under reduced pressure.

That which is claimed is:

1. A method for the continuous production of room temperature-curable organopolysiloxane compositions consisting essentially of (i) continuously feeding (A) 100 parts by weight of a diorganopolysiloxane with a viscosity at 25° C. of 0.1 to 500 Pa.s that contains at least 2 silicon-bonded hydroxyl groups or hydrolyzable groups in each molecule;

(B) 1 to 30 parts by weight of an organosilane that contains at least 2 silicon-bonded hydrolyzable groups in each molecule, or the partial hydrolysis condensate thereof;

(C) 1 to 200 parts by weight of an inorganic filler in powder form; and (D) 0 to 10 parts by weight of a cure-accelerating catalyst into a continuous mixing apparatus having starting material feed openings installed at its top, a discharge opening installed at its bottom, and a rotating disk installed within a casing, (ii) mixing (A), (B), (C), and (D) by the rotation of said rotating disk producing a mixture having a water fraction, (iii) continuously introducing the resulting mixture of (ii) into a vacuum mechanism-equipped degassing apparatus, and thereafter (iv) degassing and removing water from the mixture introduced into the degassing apparatus under reduced pressure.

2. The method in accordance with claim 1, in which the room-temperature-curable organopolysiloxane composition contains no more than 0.2 weight % water.

* * * * *